United States Patent
Tkaczyk et al.

(10) Patent No.: US 11,244,040 B2
(45) Date of Patent: Feb. 8, 2022

(54) ENFORCEMENT OF PASSWORD UNIQUENESS

(71) Applicant: International Business Machines Corporation, Armonk, NY (US)

(72) Inventors: Gregory M. J. H. Tkaczyk, Burlington (CA); Juan Hernan Rodriguez Mahecha, Bogota (CO); Krishna Oliveira De Hollanda Padilha, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 16/526,449

(22) Filed: Jul. 30, 2019

(65) Prior Publication Data
US 2021/0034735 A1 Feb. 4, 2021

(51) Int. Cl.
*H04L 29/06* (2006.01)
*G06F 17/00* (2019.01)
*G06F 21/45* (2013.01)

(52) U.S. Cl.
CPC .................................. *G06F 21/45* (2013.01)

(58) Field of Classification Search
CPC .... G06F 21/46; G06F 16/24556; G06F 21/31; H04L 9/3226; H04L 9/3234; H04L 9/3236; H04L 63/083; H04L 63/0846; H04L 63/20; H04L 63/10; H04L 63/1433
See application file for complete search history.

(56) References Cited

U.S. PATENT DOCUMENTS

| | | | |
|---|---|---|---|
| 7,346,930 B1 * | 3/2008 | Boydstun | H04L 63/02 726/29 |
| 9,984,228 B2 * | 5/2018 | Childress | G06F 21/46 |
| 11,089,036 B2 * | 8/2021 | Kutner | H04L 63/1466 |
| 2007/0289001 A1 * | 12/2007 | Havercan | G06F 21/6218 726/6 |

(Continued)

OTHER PUBLICATIONS

Jeffrey L. Jenkins et al. "Improving Password Cybersecurity Through Inexpensive and Minimally Invasive Means Detecting and Deterring Password Reuse Through Keystroke-Dynamics Monitoring and Just-in-Time Fear Appeals." Information Technology for Development. Apr. 2013.

*Primary Examiner* — Lizbeth Torres-Diaz
(74) *Attorney, Agent, or Firm* — Troutman Pepper Hamilton Sanders LLP

(57) ABSTRACT

Embodiments provide a computer implemented method of enforcing password uniqueness for different user accounts of a particular user. The method includes: receiving a first new password from a first user account of the particular user, wherein the first user account is associated with a first system/object referenced by a first Password Relationship Object (PRO); evaluating a uniqueness policy to determine whether password uniqueness is required by one or more other PROs, wherein each system/object referenced by the one or more other PROs has a different user account of the particular user; if the password uniqueness is required by the one or more other PROs, evaluating a matching policy to determine whether the first new password matches any password of each different user account associated with one or more systems/objects referenced by the one or more other PROs; if there is a match, enforcing an enforcement policy.

19 Claims, 15 Drawing Sheets

(56) References Cited

U.S. PATENT DOCUMENTS

| | | | | |
|---|---|---|---|---|
| 2009/0019514 A1* | 1/2009 | Hazlewood | ............ | H04L 63/083 726/1 |
| 2010/0058060 A1* | 3/2010 | Schneider | ............. | H04L 9/3271 713/171 |
| 2013/0014236 A1* | 1/2013 | Bingell | ................... | G06F 21/45 726/6 |
| 2015/0347494 A1* | 12/2015 | Qian | ..................... | G06F 16/245 707/702 |
| 2016/0014161 A1* | 1/2016 | Sato | ..................... | H04L 63/083 726/1 |
| 2017/0011214 A1* | 1/2017 | Cavanagh | ............... | H04L 63/06 |
| 2017/0180129 A1* | 6/2017 | Childress | .............. | G06F 3/0237 |
| 2018/0046797 A1* | 2/2018 | Maupoux | ............... | G06F 21/31 |
| 2018/0332079 A1* | 11/2018 | Ashley | ................ | H04L 63/0227 |
| 2021/0034735 A1* | 2/2021 | Tkaczyk | ................. | G06F 21/46 |

* cited by examiner

| PRO # | Relationship | Type of Referenced Object | Reference |
|---|---|---|---|
| 1 | Authentication against a referenced repository using a password | Local authentication repository; Centralized authentication repository | IP/Port/Protocol/Connection String |
| 2 | Having associated password | User account | IP/Port/Protocol/LDAP Query String/User reference string |
| 3 | Container of objects that have associated password | Group (of user accounts) | IP/Port/Protocol/LDAP Query String/Group reference string |
| 4 | Storing a list of passwords | File; URL; Database | Filename/URL/Connection String |

FIG. 1

| Ref # | PRO | Type | Common Name | System Login |
|---|---|---|---|---|
| 1 | PRO_1 | User Account | John Smith | jsmith |
| 2 | PRO_1 | User Account | Steven Chan | schan |
| 3 | PRO_1 | User Account | Fiona White | fwhite |
| 4 | PRO_1 | Service Account | Backup account | Backup |

FIG. 5

| Ref # | Global Identifier | Type | Common Name | PRO_1 | ... | PRO_12 | ... | PRO_13 |
|---|---|---|---|---|---|---|---|---|
| 1 | EMPID_1 | User | John Smith | jsmith | ... | smith | ... | john.smith@xyz.com |
| 2 | EMPID_2 | User | Steven Chan | schan | ... | chan3 | ... | steve.chan@xyz.com |
| 3 | EMPID_3 | User | Fiona White | fwhite | ... | adm_fwhite | ... | fiona.white2@xyz.com |
| 4 | SERV_ID1 | Service Account | Backup account | Backup | ... | Bkup | ... | Svc_bckup |

FIG. 11

For each PRO:

| Ref # | Account | Securely Stored Password - Full | Securely Stored Password - Character 1 | ... | Securely Stored Password – Matching Policy Character N |
|---|---|---|---|---|---|
| 1 | jsmith | 09CA7E4EAA6E8AE9C7D261167 12918483644D07DFBA7CBFBC4 C8A2E08360D5B | 2CF24DBA5FB0A30E26E83B2AC 5B9E29E1B161E5C1FA74425E730 433629389824 | ... | 486EA46224D1BB4FB680F34F7C9AD96A8 F24EC88BE73EA8E5A6C65260E9CB8A7 |
| 2 | schan | C46EC1B18CE8A878725A37E780 DFB7351F68ED2E194C79FBC6A EBEE1A667975D | ... | ... | ... |
| 3 | fwhite | 973A4A818D799636D44525DFAC 347EF440BC67F5E33C404D7824 A784465ABEAD | ... | ... | ... |
| 4 | backup | 83F1526C90A2FF58C0F287931C AB9E7E4BAF0DDD6C1306BFF32 B4F699E5AC67D | ... | ... | ... |

FIG. 12

ENFORCEMENT OF PASSWORD UNIQUENESS

TECHNICAL FIELD

The present disclosure relates generally to a system, method, and computer program product that are used to identify password re-use for assets having different perceived "value," and enforce password uniqueness between assets of different value. The system, method, and computer program product are further used to identify password re-use for different access privileges of the same user, and enforce password uniqueness for the different access privileges.

BACKGROUND

A compromise of authentication credentials (e.g., username and password) is often a critical factor of data breach in an IT (information technology) system. To protect assets or resources of high value, organizations often require users and IT administrators to use different sets of credentials for low value assets and for high value assets. In this context, the "asset" is considered to be something to which access is granted, after a successful authentication. This may include, but is not limited to: computer systems, operating systems, applications, databases, a file or set of files, hypervisors, cloud environments, network and security technologies, and the like.

The "value" of an asset is typically driven by the perceived damage to the business in case of a compromise or breach—the compromise of something of high value would indicate a major negative impact to the business, while the compromise of something of low value, may have a minor or manageable impact. Such a differentiation may be driven by compliance or regulatory requirements, such as for example the Payment Card Industry Data Security Standard (PCIDSS), where credentials used for systems supporting the credit card payment environment (high value) are different than for other enterprise systems (lower value).

Furthermore, this concept of differentiation of credentials is commonly used to differentiate accounts with different privileges on an asset. It is a common practice for different sets of credentials to be used for administrative level access (high value) versus user level access (lower value).

The purpose for such practice is to ensure that a compromise of credentials for low value assets or credentials that facilitate low privileged access, do not allow a malicious actor to compromise an asset of high value, or achieve privileged access on an asset. However, a problem with this practice exists if the user re-uses passwords across assets or accounts of different value. In one scenario, a compromise of low value credentials would allow an attacker to re-use the password for an account with access to a high value asset. In another scenario, a compromise of low value credentials would allow an attacker to re-use the password for an account that permits privileged access to the asset. Re-use of passwords defeats the purpose of separating the credentials in use for assets or accounts of varying value.

It is important to note that even if a different username is used by an individual for a low-value account and a high-value account, an attacker may be able to identify the relationship between the accounts. For example, the user's last name may appear in the username in both cases, or the username may be simply modified by a few static characters. Usernames are not considered "secret," and it must be assumed that they are well known. Therefore, it is vitally important that the passwords in use remain different, if attempting to separate assets of different value, or accounts of different privilege, through use of different credentials.

One technique for attempting to enforce the use of different passwords is through the application of different password policies. Password policies include rules which govern the permissible construction of a password, including characteristics such as password length and complexity. However, it is often possible to re-use the passwords across different password policies as long as both passwords meet the most restrictive policy (e.g., higher length, higher complexity requirements).

Furthermore, Privileged Access Management (PAM) solutions are used to manage and ensure password integrity for privileged (e.g., "Administrator" and "root") and service accounts (i.e. accounts not used by people, but by processes or systems). PAM solutions are used to manage users who can have privileged access, control the privileged password use, and provide to those users access to a pool of administrative accounts. This control can be made through a workflow with proper authentication. In some cases, the privileged session is recorded for audit purposes. PAM solutions also keep track of who has the custody for service accounts. However, PAM solutions do not have any verification whether a password has already been used or not across multiple assets, and are not generally used to manage accounts such as those of regular users.

Moreover, the use of multi-factor authentication (MFA) solutions addresses the need for strong security by adding an extra authentication step to the authentication process. Instead of using only credentials the user knows (e.g., password), it adds another requirement like something the user has (e.g., card or token generator) or something the user is (e.g., biometric). Although the use of MFA on each individual asset could limit the risk associated with password re-use, MFA is typically used for remote access, or at the boundary of sensitive network zones, and not used for individual access to assets.

SUMMARY

Embodiments further provide a computer implemented method in a data processing system comprising a processor and a memory comprising instructions, which are executed by the processor to cause the processor to implement the method of enforcing password uniqueness for different user accounts of a particular user, the method comprising: receiving, by the processor, a first new password from a first user account of the particular user, wherein the first user account is associated with a first object referenced by a first Password Relationship Object (PRO); evaluating, by the processor, a uniqueness policy to determine whether password uniqueness is required by one or more other PROs, wherein each object referenced by the one or more other PROs is associated with a different user account of the particular user; if the password uniqueness is required by the one or more other PROs, evaluating, by the processor, a matching policy to determine whether the first new password matches any password of each different user account associated with one or more objects referenced by the one or more other PROs. If there is a match, the method further comprising: enforcing, by the processor, an enforcement policy; if there is no match, the method further comprising: storing, by the processor, the first new password for the first user account.

Embodiments further provide a computer implemented method, further comprising: if there is a match, the step of enforcing the enforcement policy further comprising: blocking, by the processor, the first new password; requesting, by the processor, a second new password from the particular user; evaluating, by the processor, the matching policy to determine whether the second new password matches any password of each different user account associated with the one or more objects referenced by the one or more other PROs, wherein the step of blocking to the step of checking are repeated until an acceptable new password does not match any password of each different user account associated with the one or more objects referenced by the one or more other PROs; and storing the acceptable new password for the first user account.

Embodiments further provide a computer implemented method, wherein each PRO comprises a plurality of fields including a unique identifier, a relationship with one or more passwords, a type of referenced object, and a reference, wherein the reference includes at least one of an Internet Protocol (IP) address, a port, a protocol, a connection string, a query string, a reference string, a file, and a Uniform Resource Locator (URL).

Embodiments further provide a computer implemented method, the step of enforcing the enforcement policy further comprising reporting a password uniqueness violation. The password uniqueness violation includes the one or more other PROs on which the password uniqueness violation is found, a user account on which the password uniqueness violation is found, and a violated password uniqueness policy.

Embodiments further provide a computer implemented method, wherein a password of each different user account is stored in a password vault, and the password of each different user account is a hashed password. Each character of the password of each different user account is stored in the password vault, and each character of the password of each different user account is a hashed character.

Embodiments further provide a computer implemented method, wherein the matching policy includes a partial match, wherein in the partial match, a predetermined number of characters of the first new password are the same as the predetermined number of characters of any password of each different user account associated with the one or more objects referenced by the one or more other PROs.

Embodiments further provide a computer implemented method, wherein the first PRO includes a reference to the first object having a relationship with the first new password, wherein the first object is at least one of a local authentication repository, a centralized authentication repository, a user account, a group of user accounts, a file storing a list of passwords, a URL storing the list of passwords, and a database storing the list of passwords.

Embodiments further provide a computer implemented method, wherein the centralized authentication repository is accessible via an authentication protocol including one of Lightweight Directory Access Protocol (LDAP), Remote Authentication Dial-In User Service (RADIUS), Terminal Access Controller Access Control System (TACACS+), Open Authorization (OAuth), and Security Assertion Markup Language (SAML).

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 1 is a representation of a Password Relationship Object (PRO), according to embodiments provided herein;

FIG. 5 shows a representation of a database table for storage of onboarded accounts for each PRO, according to embodiments provided herein;

FIG. 11 shows a representation of a database table for storage of account relationships between PROs, according to embodiments provided herein;

FIG. 12 shows a representation of a database table for securely storing account passwords, and password components (e.g., character hashes) for each PRO, according to embodiments provided herein;

DETAILED DESCRIPTION

Figure 2:
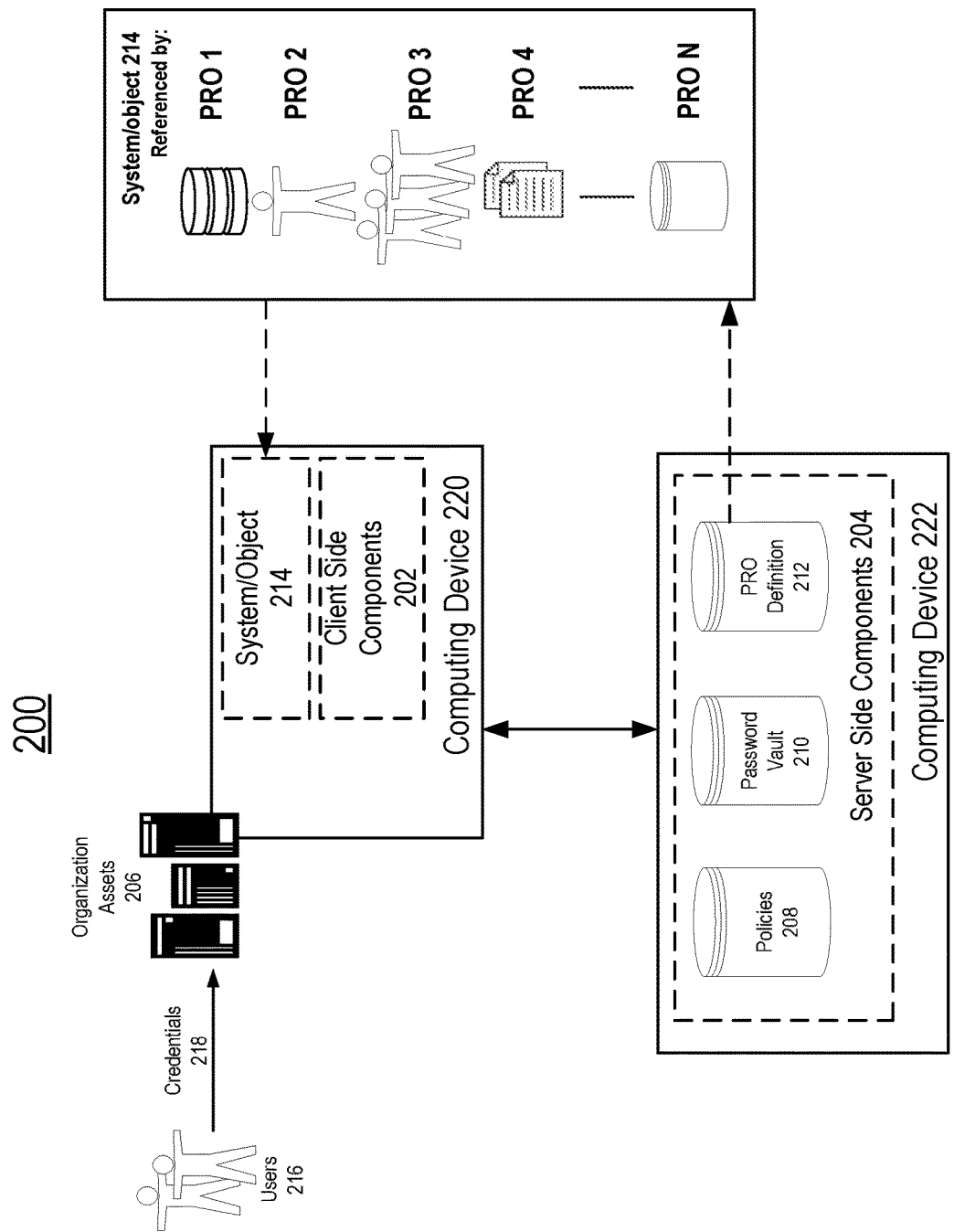
FIG. 2 is a diagram depicting an architecture of password uniqueness enforcement system 200, according to embodiments provided herein.

According to embodiments disclosed herein, a method, system, and computer product of identifying password re-use for assets having different perceived "value," and enforcing password uniqueness between assets of different value are provided. According to other embodiments disclosed herein, a method, system, and computer product of identifying password re-use for different access privileges of the same user, and enforcing password uniqueness for the different access privileges are also provided.

In an embodiment, the method, system, and computer product can utilize a new data type, i.e., Password Relationship Object (PRO), in order to describe assets, accounts, or other items which have a relationship with a password. The method, system, and computer product can identify password re-use between different PROs through the use of Uniqueness and Matching policies. The method, system, and computer product can further enforce password uniqueness between different PROs, through the use of an Enforcement Policy. In another embodiment, the method, system, and computer product can utilize container objects, such as Password Uniqueness Groups (PUGs), in order to perform identification of password re-use and enforcement of password uniqueness at scale.

FIG. 1 is a representation of a PRO, according to embodiments provided herein. A PRO is a data type which holds a reference to something that has a relationship with a password. For example, PRO_1 references a local authentication repository or a centralized authentication repository. Because an authentication repository (a local authentication repository or a centralized authentication repository) is used to store user names and passwords for accessing one or more organization assets, and thus the authentication repository has a relationship with a password, and the relationship may be "authentication against the referenced repository using a password". These types of references may include, but are not limited to: references to local authentication repositories located on servers, computer operating systems, applications, databases, network devices, security technologies, hypervisors, or cloud environments; and references to centralized authentication repositories, such as centralized databases and Active Directory, including other centralized authentication repositories accessible via authentication protocols, such as Lightweight Directory Access Protocol (LDAP), Remote Authentication Dial-In User Service (RADIUS), Terminal Access Controller Access Control System (TACACS+), Open Authorization (OAuth), Security Assertion Markup Language (SAML), etc., both on premise and in the cloud.

In other embodiments, the PRO may hold a reference to a user identity or set of identities, which have an associated password (e.g., a user account for PRO_2, or a group of accounts for PRO_3, etc.). In another embodiment, PRO_4 may hold a reference to a file, a database, or a Uniform Resource Locator (URL), etc., storing a list of "passwords." In an embodiment, the list of "passwords" may be prevented for use as a new password. For example, if a user proposes a new password the same as any "password" in the list, then the user will be prompted with "this password is not allowed." Other types of relationships to passwords may exist, and thus are not limited to the embodiments provided herein.

As shown in FIG. 1, in an embodiment, there are four types of PROs. Each PRO may contain fields such as a unique identifier, a relationship with a password, a type of referenced object, and a reference. The reference can be uniquely identified through, for example, an Internet Protocol (IP) address, port, protocol, connection string, query string, reference string, file, or URL, etc., or a combination of any above-mentioned elements.

FIG. 2 is a diagram depicting an architecture of password uniqueness enforcement system 200, according to embodiments provided herein. As shown in FIG. 2, users 216 can access organization assets 206 using credentials 218, such as a user name and a password. Examples of organization assets may include but is not limited to: computer systems, operating systems, applications, databases, a file or set of files, hypervisors, cloud environments, network and security technologies, and the like. Client side components 202 of the enforcement system 200, such as a software agent, or a native capability based system leveraging an Application Programming Interface (API), can operate on the first computing device 220. The organization assets 206 being accessed by users 216 may be located at the first computing device 220 (for example in the case of a local authentication repository stored on the first computing device 220) or may be located remotely at one or more other servers (for example, in the case of a centralized authentication repository like Active Directory located on the first computing device 220).

Further referring to FIG. 2, the server side components 204, including uniqueness policies, matching policies, and enforcement policies 208, password vault 210, and PRO definition 212 containing the hashed passwords and the hashed password characters (cryptographic keys and secret salts are applied for hashing passwords) for each PRO, are located at the second computing device 222. The system/object 214 referenced by a PRO as defined in the PRO definition 212 (for example, PRO_1, PRO_2, . . . PRO_N), such as a local authentication repository, a centralized authentication repository, a user account, a group of user accounts, or a file storing a list of passwords, etc., has a relationship with passwords as illustrated in FIG. 1. The system/object 214 referenced by PRO_1, PRO_2, PRO_3, . . . , or PRO_N is located at the first computing device 220 or located remotely at one or more other servers. The system/object 214 is monitored for password changes by client side components 202. In one embodiment, the password uniqueness enforcement system 200 is provided to monitor for the password change on credentials 218, stored in system/object 214. In another embodiment, the password uniqueness enforcement system 200 is provided to monitor for changes to a list of passwords stored in system/object 214. Client side components 202 communicate to server side components 204 in order to monitor for password changes, and execute actions based on defined uniqueness, matching, and enforcement policies 208.

Figure 3:
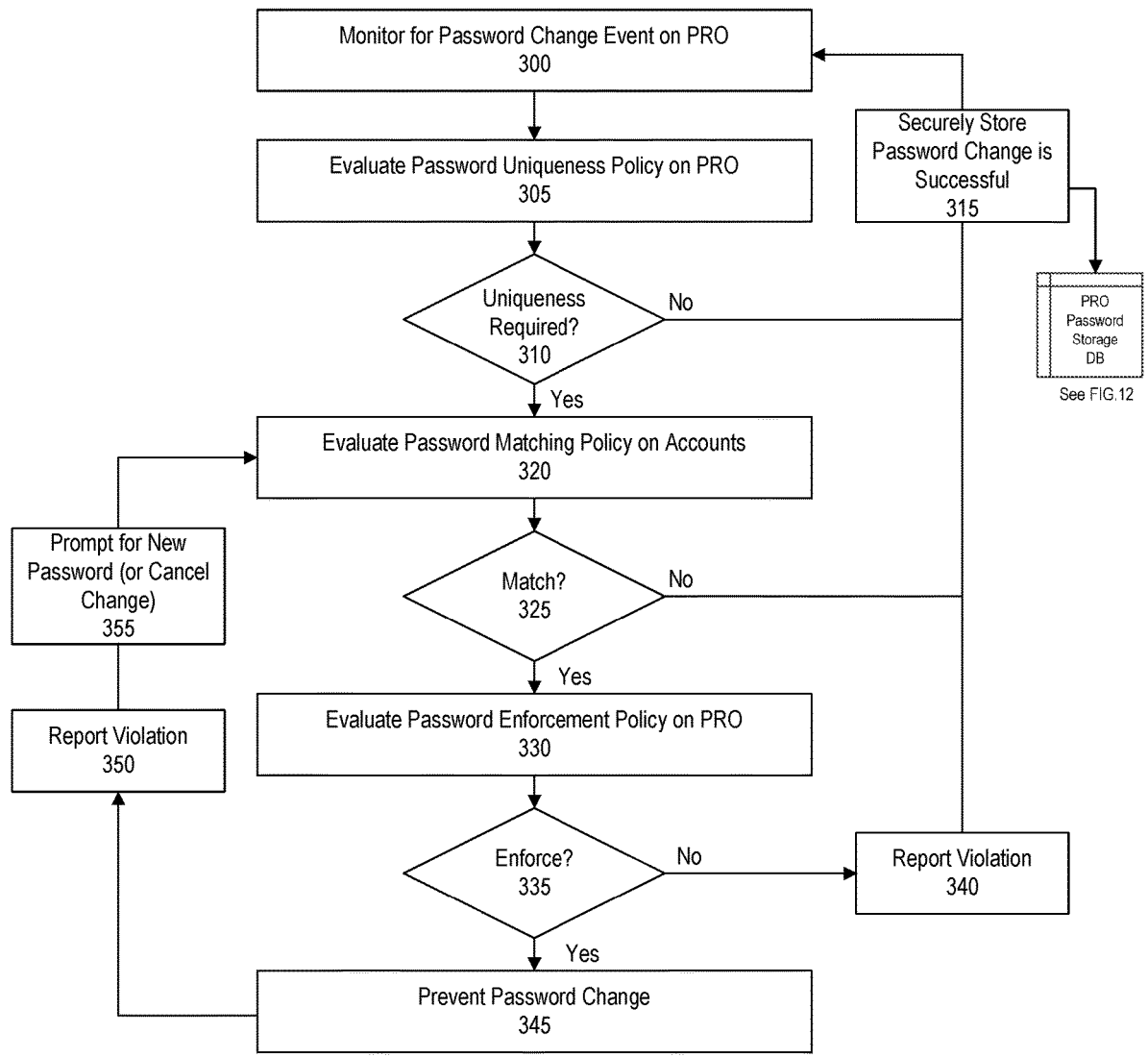
FIG. 3 is a flow diagram showing the process of password uniqueness enforcement, according to embodiments provided herein.

FIG. 3 is a flow diagram showing the process of password uniqueness enforcement, according to embodiments provided herein. A Password Relationship Object (PRO) is defined as a data type to describe relationships to passwords; a Password Uniqueness Group (PUG) is defined to group multiple objects into a container where use of the same password is permitted, but not required. A Uniqueness Policy is defined to describe how password uniqueness is required (e.g., a uniqueness policy which says "Do not allow the accounts in Repository 1 (referenced by PRO_1) to have the passwords listed in this static file referenced by PRO_4"). A Matching Policy is defined to describe how to identify re-use of a password (e.g., full match, or partial match, etc.). An Enforcement Policy is defined to describe what actions are taken after a password match. The system 200 has a proactive capability to stop a password change from occurring. Query and reporting functions, both ad-hoc and scheduled, can be used to find policy violations. As shown in FIG. 3, at step 300, the system 200 monitors for a password change event impacting any PRO. This could occur, for example, because a user is actively changing their password, or a new account is being created upon a monitored PRO. At step 305, once an attempted password change is identified, the potential new password is captured, and all Password Uniqueness Policies impacting the PRO (PRO_A) are evaluated to determine if a password uniqueness requirement exists with another PRO (PRO_B). At step 310, if password uniqueness is not required, the system 200 allows the password change to proceed. At step 315, the system 200 waits for confirmation from PRO_A that the password change was in fact successful (e.g., the potential new password meets the password policy of PRO_A: complexity, history, etc.). If so, at step 315, the system 200 securely stores the password and its character components to facilitate future matching policy checks, for example in a database table as shown in FIG. 12, and then the process returns to the step 300.

If password uniqueness is required, then the process continues to the step 320. At step 320, for each pair of PROs (PRO_A, PRO_B) where a uniqueness requirement exists, all relevant Password Matching Policies impacting the two PROs are evaluated to determine whether the new potential password provided in the password change attempt on PRO_A matches the existing password for PRO_B. At step 325, if a match does not exist, the system 200 allows the password change to proceed. Specifically, at step 315, the system 200 waits for confirmation from PRO_A that the password change was in fact successful, securely stores the password as necessary, and returns to the step 300.

If a match does exist, the process continues to the step 330. At step 330, for each pair of PROs (PRO_A, PRO_B) where a password match occurs, all relevant Password Enforcement Policies impacting the two PROs are evaluated to determine whether to prevent the password change, or just report on a violation. At step 335, if uniqueness enforcement is not required, the password change is permitted and the step 340 is then performed. Otherwise, if uniqueness enforcement is required, the step 345 is then performed.

In an embodiment, at step 340, optional actions are taken for reporting a violation of the password uniqueness and matching policies. For example, the optional actions may include logging the violation within an audit log, generating reports, emailing notifications, triggering an alert in a Security Information and Event Management (SIEM) solution, or taking any other actions. After that, the step 315 is performed. In another embodiment, if uniqueness enforcement is not required, the step 315 can be directly performed without performing the step 340.

At step 345, actions are taken to prevent the password change from occurring. In an embodiment, the step 350 is performed for reporting a violation of the password uniqueness and matching policies (the same as the step 340). After that, in an embodiment, at step 355, the system 200 prompts the user to select a new password and continues to step 320 to check the matching policy again. In another embodiment, the potential password change is cancelled or blocked, and the process directly returns to the step 300. In the case that the password change is cancelled or blocked, the system 200 does not store the new proposed password or its password components (i.e., character components).

In an embodiment, in order to address the problem of providing password uniqueness, matching, and enforcement policies for each PRO individually, password uniqueness is identified and optionally enforced between groups of PROs. The groups of PROs are introduced through the definition of container objects, called Password Uniqueness Groups (PUGs). A PUG is container that holds PROs where, by default, the use of the same password is permitted for a given user across PROs within the PUG. As such, a PUG may contain a group of various PROs, including authentication repositories and accounts. A PUG may also contain other PUGs, creating a nested or hierarchical structure.

The PUG is a container that allows more efficient policy writing. The fact that different PROs may be within different PUGs does not immediately imply that password uniqueness is required for different PUGs. A Password Uniqueness Policy must be applied to the PUGs in order to specify a uniqueness requirement. Additionally, although by default the PUG is a construct to group together PROs where the use of the same password is permitted, this is not mandatory, and PROs in a PUG could also have uniqueness requirements between them on an exception basis. When determining uniqueness requirements, the resultant set of all Uniqueness Policies applied on the PUGs (including inherited policies due to the hierarchy, exceptions, etc.) is considered to determine a uniqueness requirement for each PRO.

In an embodiment, the definition of a PRO and/or PUG could be based on various technical and business factors of organizations. For example, an organization may wish to:

(1) ensure that users which have separate accounts in multiple administrative or security boundaries (e.g., Active Directory domains of high value and low value) use unique passwords for each account, i.e., the accounts owned by the same user have different passwords;

(2) enforce password uniqueness between assets in various geographies;

(3) ensure that administrators of a multi-tenant environment use different passwords for each tenant-associated account they use;

(4) enforce password uniqueness between an IT administrator's user level, and privileged accounts;

(5) enforce password uniqueness between accounts used in different cloud environments; or/and (6) enforce password uniqueness between accounts used for infrastructure (e.g., network devices, security technologies, hypervisors) and higher layer accounts (e.g., operating systems, applications).

In an embodiment, the system 200 has the ability to intercept the password creation and change events in order to capture the potential changed password and compare it against the passwords that have a relationship with PROs and PUGs through uniqueness and matching policies. To compare the passwords, the system 200 may access a password vault where passwords and password components are securely stored in different cryptographic forms.

To intercept a password change/creation event and capture the password, in an embodiment, software agents can be deployed at authentication points to intercept the password events and integrated with a centralized solution to check against defined password uniqueness, matching and enforcement policies. In another embodiment, the system 200 can be integrated as a part of an authentication repository or operating system via APIs that provide password uniqueness validation and response services. As a consequence of the system architecture, ad-hoc or scheduled queries to validate password uniqueness, the system 200 could be used for compliance or audit purposes.

The advantage of using the system 200 over a Privileged Access Management (PAM) solution or Multi-Factor Authentication (MFA) solution is that it can directly address the risk of password re-use. However, the system 200 could be integrated into existing PAM or other identity management solutions.

Figure 4:
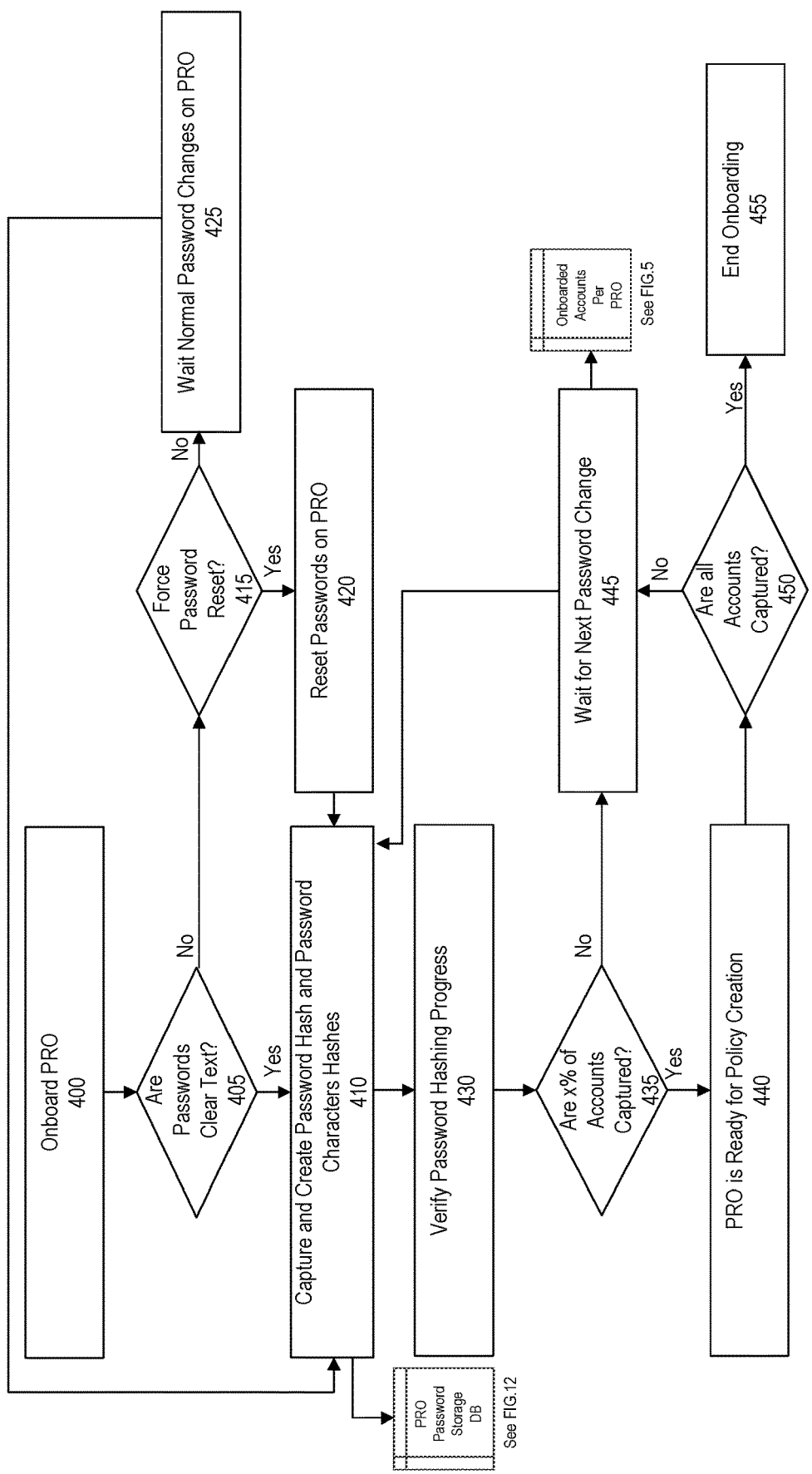
FIG. 4 is a flow diagram of the onboarding process for a PRO, according to embodiments provided herein.

FIG. 4 is a flow diagram of the onboarding process for a PRO, according to embodiments provided herein. When a new PRO is created, for example, PRO_1 referencing a local authentication repository is created, the onboarding operation is required to obtain the corresponding passwords, for example, the passwords stored in the local authentication repository referenced by PRO_1. Simply adding a reference to the local authentication repository may not allow the system 200 to immediately enforce a uniqueness/matching/enforcement policies, because the system 200 may not have access to the passwords for comparison. During PRO onboarding, the system 200 is able to securely obtain and store each password and its password components (character components of each password) for the newly created PRO, e.g., PRO_1. If each password is available in cleartext on the system/object (i.e., system or object) referenced by the PRO_1, then this onboarding process can happen immediately. For example, a file containing a list of passwords referenced by PRO_4 which is not encrypted, cryptographically hashed, or stored in a format which is unreadable by system 200, may be considered to be cleartext. However, in most cases, obtaining the cleartext password information is only possible during a password change. In that case, the onboarding process provides the option of forcing a password change for accounts on the system/object referenced by PRO_1 (so that it can be onboarded sooner), or allowing the natural password change processes to occur (e.g., wait until the password change window, such as 90 days, has expired and therefore most of accounts will be subject to a password change). The PRO_1 is ready to be used in a uniqueness policy once a defined percentage of passwords have been captured. Even if the PRO_1 is ready to be used in a uniqueness policy, the remaining accounts can continue to be onboarded until all the accounts in the local authentication repository referenced by the PRO_1 are onboarded. Similarly, in an embodiment, the system 200 keeps monitoring for account additions, and onboard those newly added accounts for the PRO_1.

In an embodiment, as shown in FIG. 4, at step 400, PRO_1 onboarding starts. At step 405, the system 200 checks whether passwords of accounts in the local authentication repository referenced by PRO_1 are in cleartext. If the passwords are all in cleartext, then at step 410, the system 200 creates password hash and password character hashes for each password, and stores the password hash and password character hashes in a PRO_1 password storage database (DB) table (as illustrated in FIG. 12). If the passwords are not all in cleartext, then at step 415, the system 200 checks whether a forced password reset is needed. In an embodiment, this could be specified as an option by the operator of system 200 which is onboarding PRO_1. If the forced password reset is needed, then at step 420, all the passwords on the local authentication repository referenced by PRO_1 are marked to be reset upon the next user login. This configuration change may occur via the client side component of system 200, via an API integration, or some other mechanism. Step 410 is further performed once each user subsequently logs in and changes their password. If the forced password reset is not needed, then at step 425, the system 200 waits for normal password changes to occur on the system/object referenced by PRO_1. Since the passwords are available in cleartext during processing of normal password changes (for example, in computer system memory), the step 410 can be performed. At step 430, the system 200 verifies password hashing progress. Specifically, the stored hashes are compared against the number of accounts on the local authentication repository referenced by PRO_1. The PRO_1 needs a predetermined percentage (e.g., 70%) of account passwords to be captured before PRO_1 can be used for uniqueness policy definition. At step 435, the system 200 checks whether a predetermined percentage (e.g., 70%) of accounts are captured. If the predetermined percentage (e.g., 70%) of accounts are captured, then at step 440, PRO_1 is ready for uniqueness policy creation. If less than the predetermined percentage (e.g., 70%) of accounts are captured, then at step 445, the system 200 waits for next password change on the system/object referenced by PRO_1, and the step 410 is further performed. At step 450, the system 200 checks whether all the accounts of PRO_1 are captured. If all the accounts of PRO_1 are captured, then at step 455, the PRO_1 onboarding process ends. If not all the accounts of PRO_1 are captured, then at step 445, the system 200 waits for next password change for PRO_1, and the step 410 is further performed.

FIG. 5 shows a representation of a database table for storage of onboarded accounts for each PRO, according to embodiments provided herein. As shown in FIG. 5, "PRO_1" has four onboarded accounts, wherein three accounts are user accounts while one account is a service account.

Figure 6:
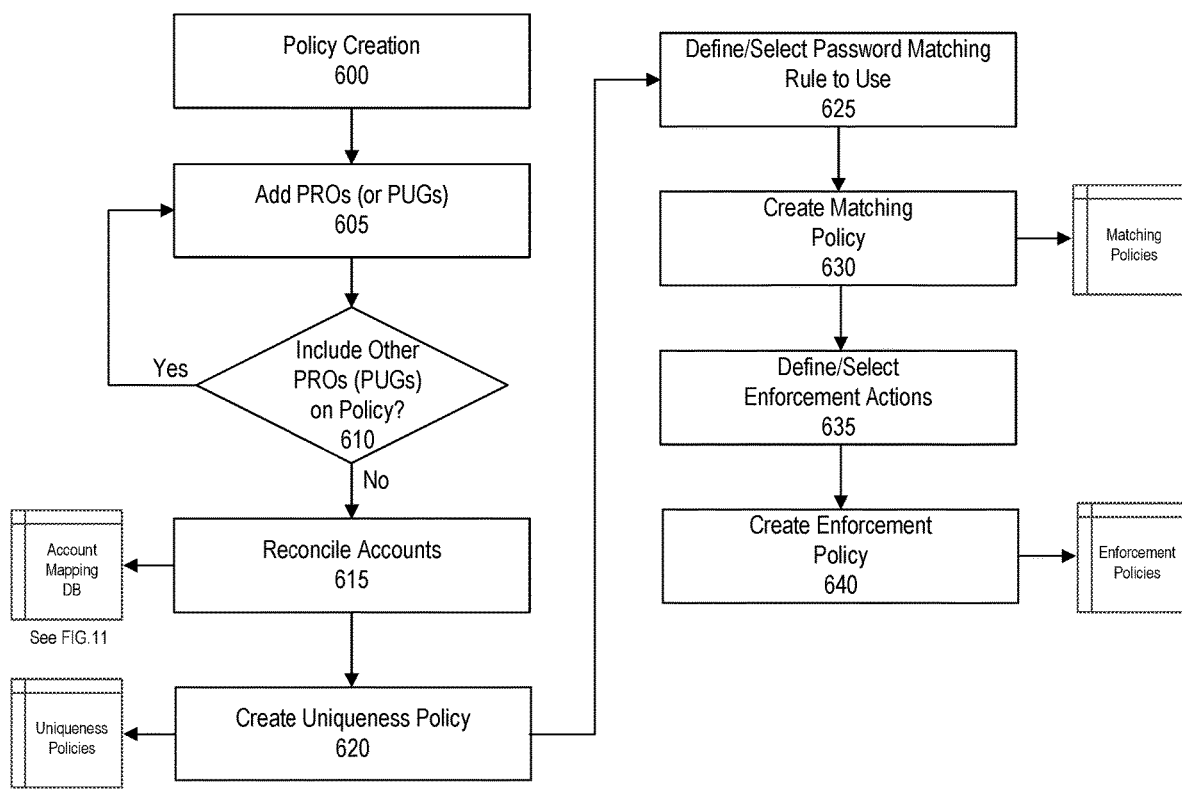
FIG. 6 is a flow diagram of uniqueness, matching, and enforcement policy creation, according to embodiments provided herein.

FIG. 6 is a flow diagram of uniqueness, matching, and enforcement policy creation, according to embodiments provided herein. The uniqueness policy specifies a set of PROs (or PUGs) for which password re-use have to be identified. It requires the account reconciliation between accounts on systems/objects referenced by PROs and the establishment of a global identifier. The matching policy determines the set of rules used to compare a proposed password against existing passwords. It defines how the password will be compared, for example a full match or a partial match. The enforcement policy defines the actions that will be taken when a uniqueness and matching policy violation (i.e., the proposed password is the same as, or similar to, an existing password for the same user) occurs. The actions include just reporting the violation, actively preventing the password change, or both.

In an embodiment, as shown in FIG. 6, at step 600, the policy creation starts. At step 605, a set of PROs (or PUGs) are specified and included for policy creation. At step 610, the system 200 checks whether other PROs (or PUGs) need to be included for policy creation. If more PROs (or PUGs) need to be included for policy creation, then the step 605 is performed. If no more PROs (or PUGs) need to be included for policy creation, then at step 615, the accounts are reconciled or mapped between different PROs. For example, as shown in FIG. 11, each user has different user names on systems referenced by different PROs. The user "John Smith" has a user name "jsmith" on PRO_1, . . . , a user name "smith" on PRO_12, and a user name "john.smith@xyz.com" on PRO_13, etc. Upon reconciliation, a global identifier "EMPID_1" is assigned to the user "John Smith," even though he has many different user names on various systems. Similarly, a global identifier "EMPID_2" is assigned to the user "Steven Chan," even though he has different user names, i.e., "schan" for PRO_1, . . . , "chan3" for PRO_12, and "steve.chan@xyz.com" for PRO_13, etc.; a global identifier "EMPID_3" is assigned to the user "Fiona White," even though she has different user names, i.e., "fwhite" for PRO_1, . . . , "adm_fwhite" for PRO_12, and "fiona.white2@xyz.com" for PRO_13, etc.; and a global identifier "SERV_ID1" is assigned to the service account "Backup account," even though it has different user names, i.e., "backup" for PRO_1, . . . , "bkup" for PRO_12, and "Svc_bckup" for PRO_13, etc.

After account reconciliation 615, at step 620, a uniqueness policy is created. For example, referring to FIG. 11, uniqueness policy recites that passwords cannot be re-used for PRO_1, PRO_12, and PRO_13, i.e., the user "John Smith" should have three different passwords for three different user names "jsmith" on PRO_1, "smith" on PRO_12, and "john.smith@xyz.com" on PRO_13. The same applies to "Steven Chan," "Fiona White," and "Backup account." At step 625, a matching rule is defined. In an embodiment, a full match is required. For example, if the password for "jsmith" on PRO_1 is exactly the same as the password for "smith" on PRO_12, then a match of is identified. In an embodiment, a partial match in any defined portion of the password is required. For example, "goodmorning" and "goodmorn" have eight of the same characters, which are more than a predetermined number (e.g., five) of same characters, and thus a match of the two passwords is identified. Different matching rules can be defined if applicable. At step 630, a matching policy reciting the matching rules defined at step 625 is created. At step 635, an enforcement action in case of a match is defined. In an embodiment, a violation report indicating a password match is sent to the user. In another embodiment, a proposed password change is prevented or blocked. At step 640, an enforcement policy reciting one or more enforcement actions defined at step 635 is created.

Figure 7:
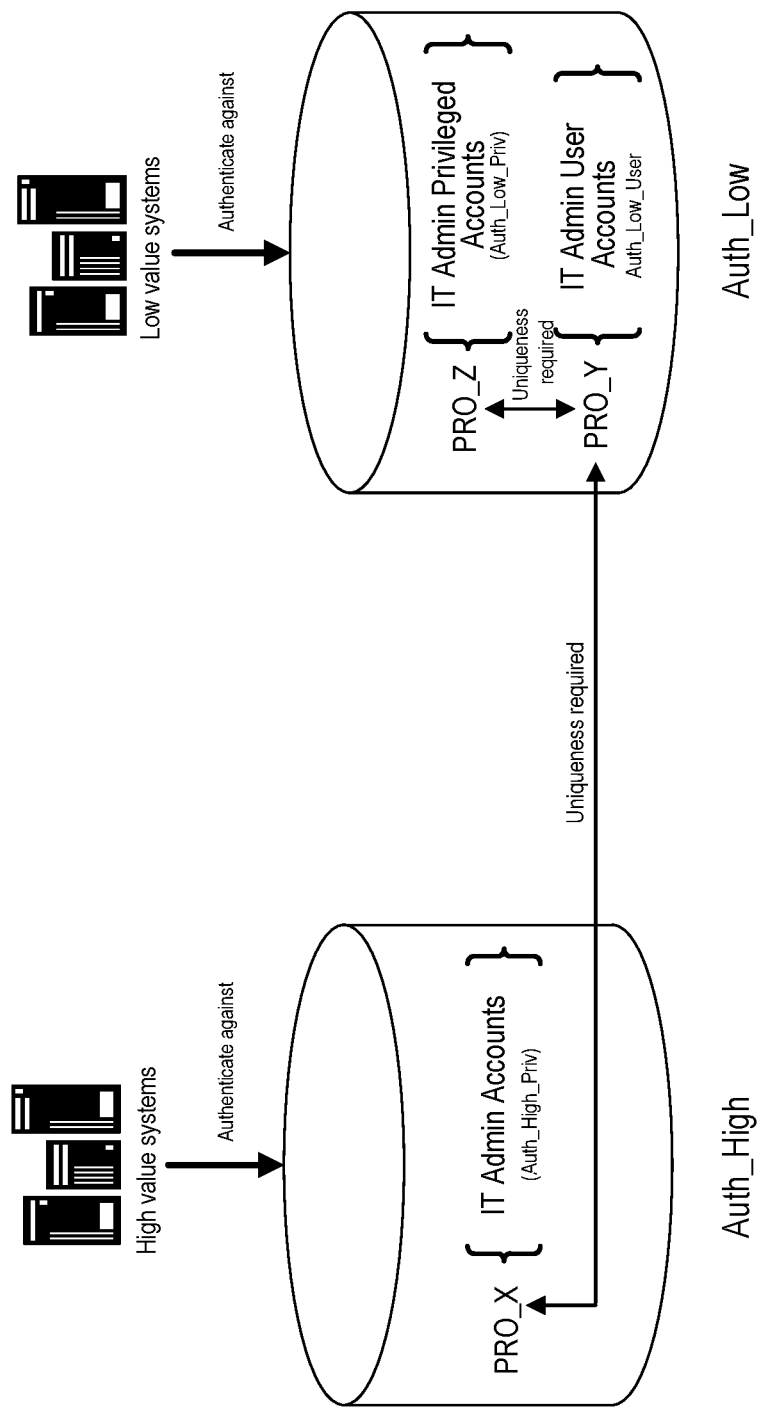
FIG. 7 is a logical representation of a PRO to PRO uniqueness policy that could be created between three PROs defined on two authentication repositories, according to embodiments provided herein.

FIG. 7 is a logical representation of PRO to PRO uniqueness policies that could be created between three PROs defined on two authentication repositories, according to embodiments provided herein. As an example, referring to FIG. 7, there are two authentication repositories in use, one for high value computer systems (Auth_High) and one for low value computer systems (Auth_Low). In this example, an IT administrator has an account in Auth_High (Auth_High_Priv), and also has two accounts in Auth_Low— one for user level access (Auth_Low_User), and one for privileged access (Auth_Low_Priv). Therefore, three PROs are defined: PRO_X=Auth_High_Priv, PRO_Y=Auth_Low_User, and PRO_Z=Auth_Low_Priv. A Password Uniqueness Policy is created to describe rules for password re-use. As an example, the IT administrator is permitted to use the same password for the account referenced by PRO_X (Auth_High_Priv) and PRO_Z (Auth_Low_Priv) if he/she chooses to do so, but ensure a unique password is used for the account referenced by PRO_Y (Auth_Low_User). Therefore, the Password Uniqueness Policy would specify that uniqueness is required between PRO_Y and PRO_X, as well as between PRO_Y and PRO_Z.

Figure 8:
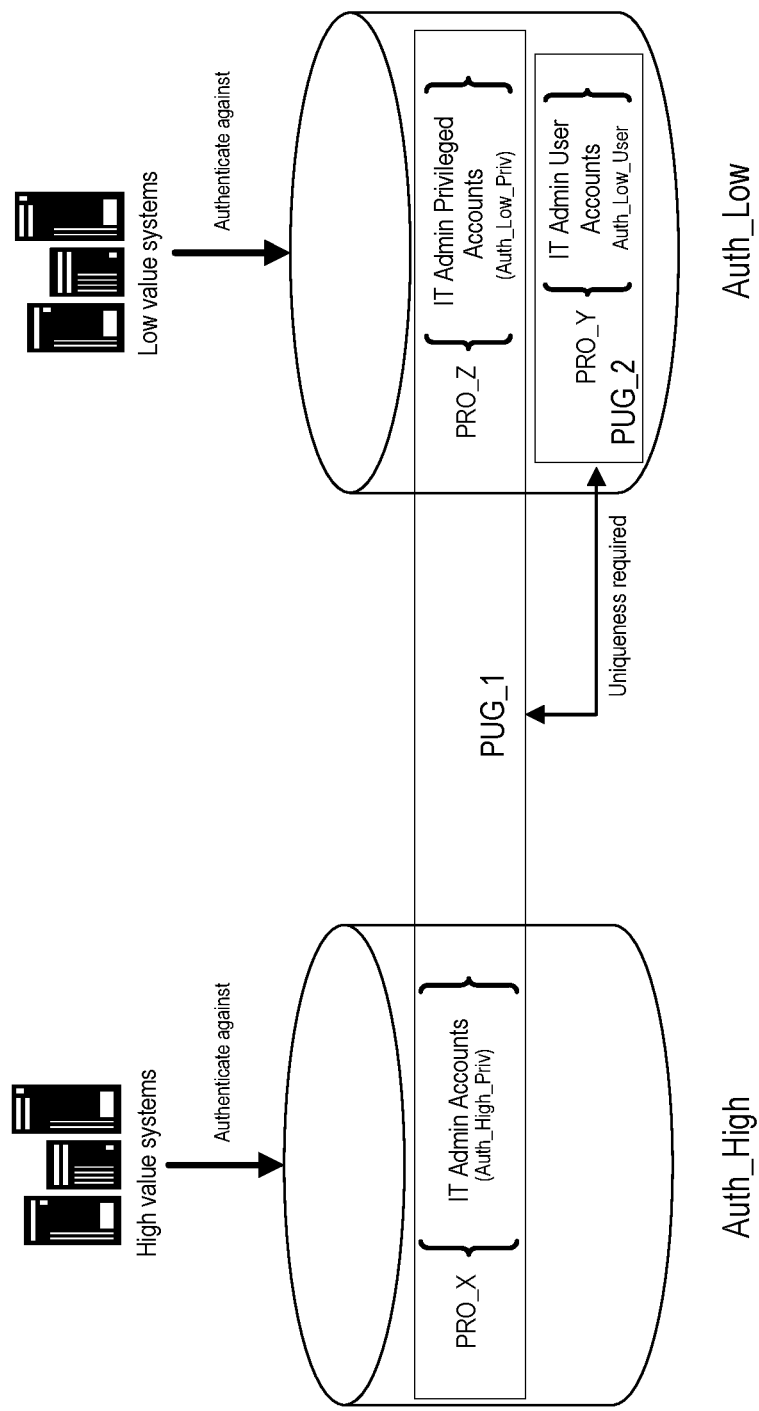
FIG. 8 is a logical representation of a Password Uniqueness Group (PUG) to PUG uniqueness policy that could be created for the same two authentication repositories as illustrated in FIG. 7, according to embodiments provided herein.

FIG. 8 is a logical representation of PUG to PUG uniqueness policies that could be created for the same two authentication repositories as illustrated in FIG. 7, according to embodiments provided herein. As shown in FIG. 8, two PUGs are defined: PUG_1=(PRO_X, PRO_Z), PUG_2= (PRO_Y). User accounts referenced by PROs in the same PUG can optionally have the same password. For example, accounts referenced by PRO_X and PRO_Z belong to PUG_1, and thus the accounts referenced by PRO_X and PRO_Z can optionally have the same password, i.e., uniqueness is not required for the accounts referenced by PRO_X and PRO_Z. In this example, the Password Uniqueness Policy would specify that uniqueness is required between PUG_1 and PUG_2. Thus, compared to the example as shown in FIG. 7, a simpler Uniqueness Policy to enforce password uniqueness between PUG_1 and PUG_2 is created.

Figure 9:
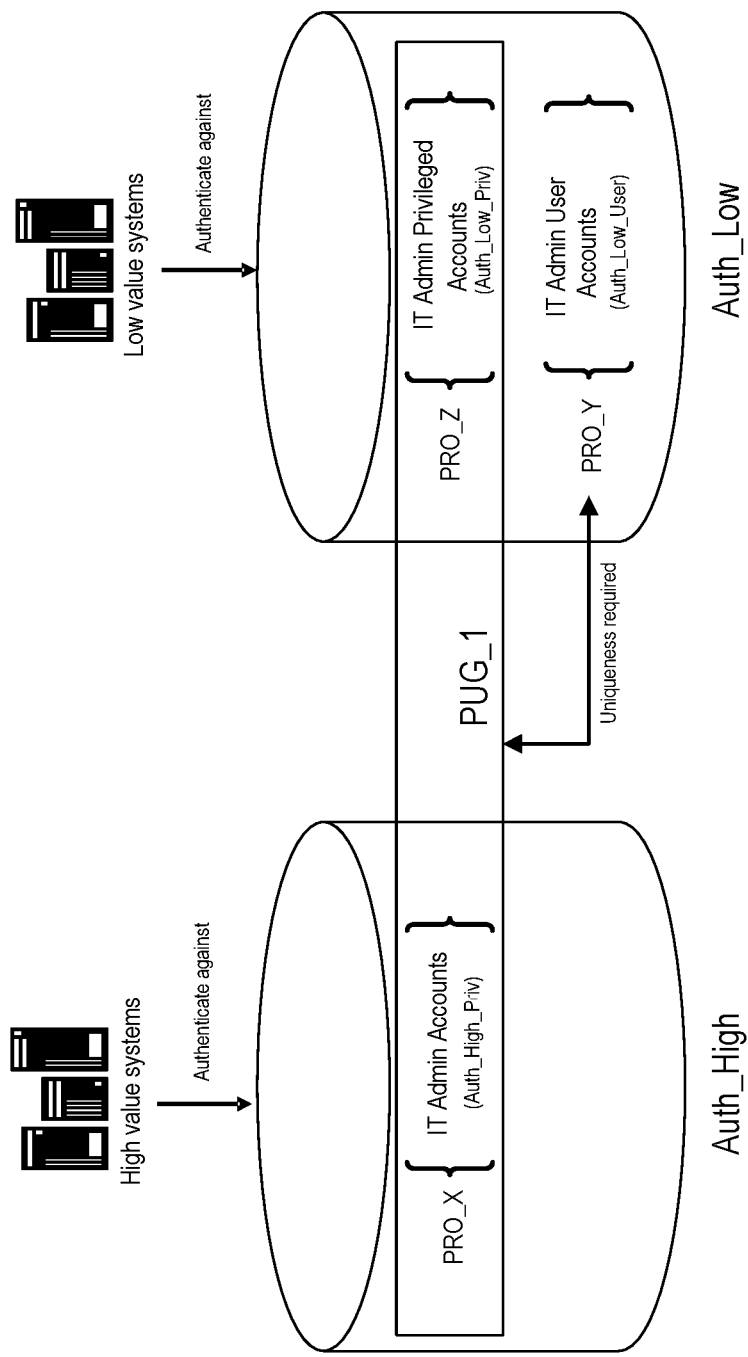
FIG. 9 is a logical representation of a PUG to PRO uniqueness policy that could be created for the same two authentication repositories as illustrated in FIG. 7, according to embodiments provided herein.

FIG. 9 is a logical representation of a PUG to PRO uniqueness policy that could be created for the same two authentication repositories as illustrated in FIG. 7, according to embodiments provided herein. Accounts referenced by PROs in the same PUG can optionally have the same password. For example, PRO_X and PRO_Z belong to PUG_1, and thus accounts referenced by PRO_X and PRO_Z can optionally have the same password, i.e., uniqueness is not required for PRO_X and PRO_Z. In this example, the Password Uniqueness Policy would specify that uniqueness is required between PUG_1 and PRO_Y.

Figure 10:
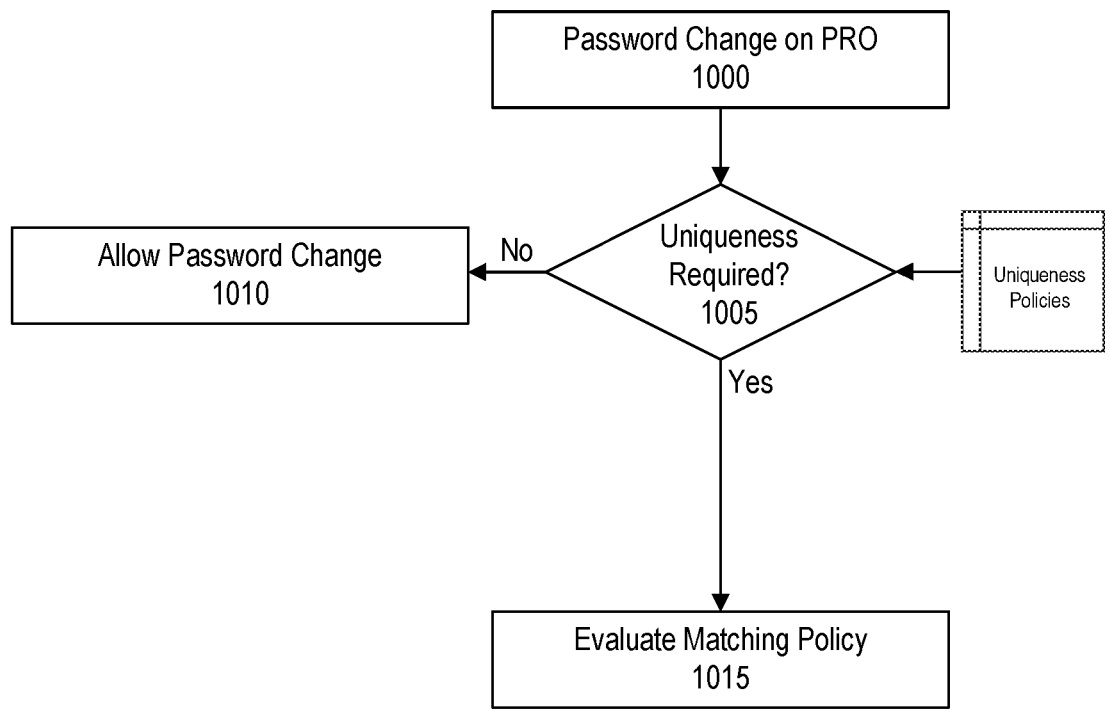
FIG. 10 is a flow diagram showing the process to evaluate the Uniqueness Policy between PROs, according to embodiments provided herein.

FIG. 10 is a flow diagram showing the process to evaluate the Uniqueness Policy between PROs, according to embodiments provided herein. At step 1000, there is a proposed password change on a PRO. At step 1005, the system 200 checks if there is any Password Uniqueness Policy related to this PRO. If there is no Password Uniqueness requirement for this PRO, then at step 1010, the proposed password change is allowed. If there is any Password Uniqueness Policy available for this PRO, then at step 1015, the matching policy is applied to check whether the proposed password is the same as or similar to existing passwords on other PROs.

FIG. 11 shows a representation of a database table for storage of account relationships between PROs, according to embodiments provided herein. Each user has different user names on systems referenced by different PROs. The user "John Smith" has a user name "jsmith" on PRO_1, . . . , a user name "smith" on PRO_12, and a user name "john.smith@xyz.com" on PRO_13, etc. Upon reconciliation, a global identifier "EMPID_1" is assigned to the user "John Smith," even though he has many different user names on various systems. Similarly, a global identifier "EMPID_2" is assigned to the user "Steven Chan," even though he has different user names, i.e., "schan" for PRO_1, . . . , "chan3" for PRO_12, and "steve.chan@xyz.com" for PRO_13, etc.; a global identifier "EMPID_3" is assigned to the user "Fiona White," even though she has different user names, i.e., "fwhite" for PRO_1, . . . , "adm_fwhite" for PRO_12, and "fiona.white2@xyz.com" for PRO_13, etc.; and a global identifier "SERV_ID1" is assigned to the service account "Backup account," even though it has different user names, i.e., "backup" for PRO_1, . . . , "bkup" for PRO_12, and "Svc_bckup" for PRO_13, etc.

FIG. 12 shows a representation of a database for securely storing account passwords, and password components (e.g., character hashes) for each PRO, according to embodiments provided herein. Secure password storage can be done using well known methods, including one-way hashes with different secret salts used for each character component (e.g., secret salts by PRO, account, character or any combination of character components, etc.). A secret salt is random data that is used as an additional input to a one-way function that "hashes" data, e.g., a password or passphrase. Secret salts are used to safeguard passwords in storage. As shown in FIG. 12, in an embodiment, each character of a password is securely stored, in addition to the full password. In this case, a partial matching policy is also supported, because the characters of a stored password can be compared with the characters of a proposed password. If a predetermined number of characters of a stored password are the same as a predetermined number of the characters of a proposed password, then a partial match is identified. In an embodiment, the characters defined in the partial matching policy are adjacent with each other. In another embodiment, the characters defined in the partial matching policy are separate from each other. In another embodiment, some of the characters defined in the partial matching policy are adjacent with each other, while one or more other characters defined in the partial matching policy are separate from each other.

Figure 13:
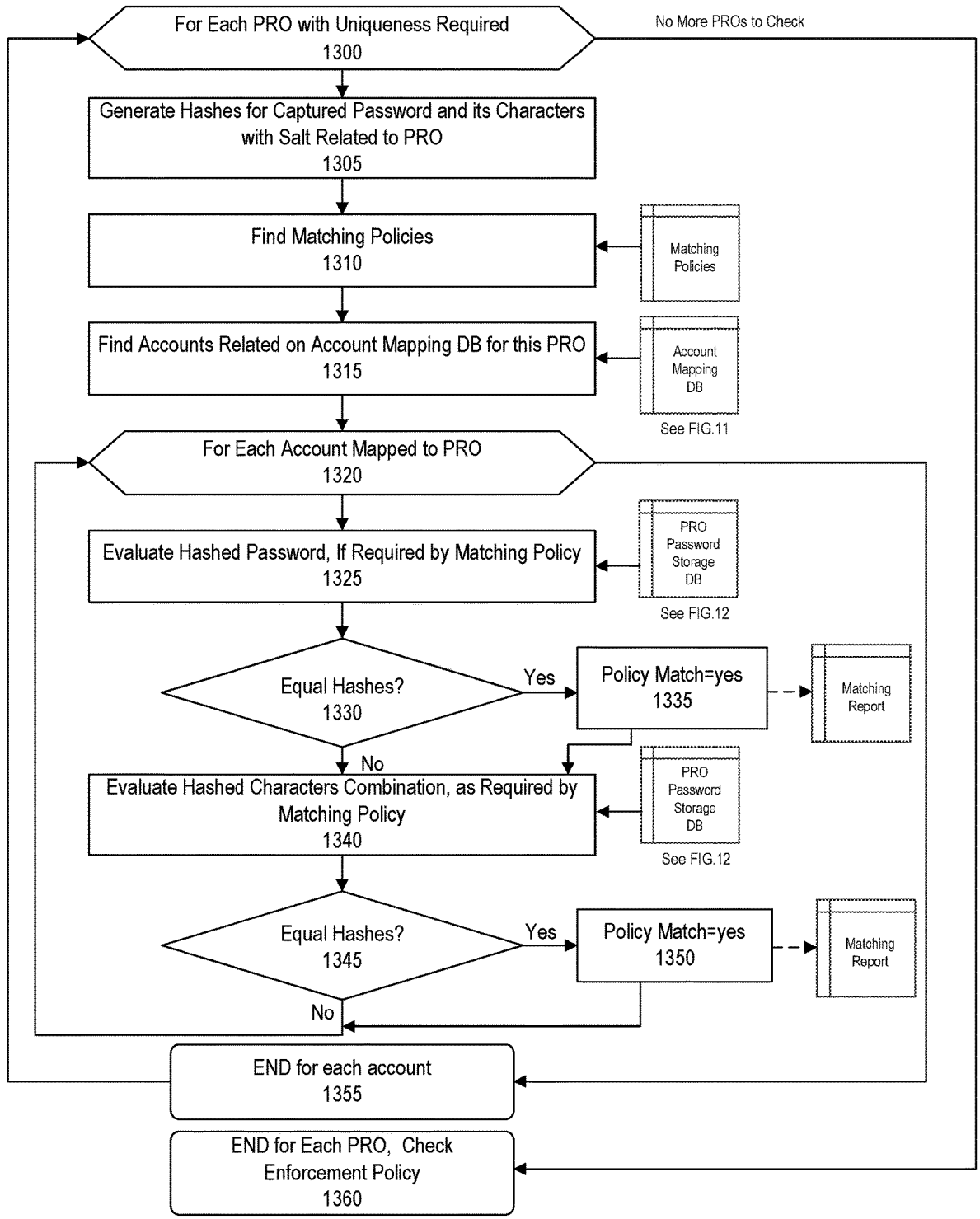
FIG. 13 is a flow diagram showing the process to evaluate the currently proposed password against existing passwords having a uniqueness requirement, according to embodiments provided herein.

FIG. 13 is a flow diagram showing a process to evaluate the currently proposed password against existing passwords having a uniqueness requirement, according to embodiments provided herein. Once it is determined that a password uniqueness requirement exists between two (or more) PROs, the applicable Matching Policies are evaluated to determine whether a matching violation (i.e., password match) exists. The Matching Policies describe what is considered a password match. In the simplest case, a full match (i.e. identical passwords) would establish a match. In other embodiments, passwords with strong similarities could be considered a match. This could include, for example: the same first/last/middle "X" number of characters (e.g., "secret1" vs "secret2"=match), the use of the same characters in a different part of the word ("mysecret" vs "secretpass"=match), etc. This limits the risk of an attacker guessing or brute forcing a high value password in case a low value password is compromised. This capability can be established by storing and comparing character-by-character hashes of the password. If a match is identified, a matching report including the account and PRO on which the password change is occurring, the account and PRO on which password match violation is found, and the matching policy which is violated, is generated. Once the password is evaluated against all matching policies for all PROs with which uniqueness is required, the system 200 evaluates the Enforcement Policy for each match violation.

After the Uniqueness Policy between PROs are evaluated as illustrated in FIG. 10, then as shown in FIG. 13, at step 1300, the matching policy evaluation starts to compare the proposed password (for use by account in system/object referenced by PRO_Change) against the existing password referenced by every other PRO having a uniqueness requirement (PRO_Compare_1 . . . PRO_Compare_N). At step 1305, hashes with secret salts are generated for the proposed new password and each of its characters, using the secret salt associated with PRO_Compare_N. At step 1310, one or more matching policies for this PRO_Compare_N are retrieved. At step 1315, all the associated accounts on this PRO_Compare_N are found, e.g., through account mapping database as shown in FIG. 11. At step 1320, the matching policy evaluation starts for each account on this PRO_Compare_N. At step 1325, the system 200 retrieves the full hashed password of this account (referenced by PRO_Compare_N) from the PRO password storage database as shown in FIG. 12. The system 200 checks whether the full hashed password of this account (referenced by PRO_Compare_N) is the same as the full hashed new password (referenced by PRO_Change). At step 1330, if the full hashed password of this account is the same as the full hashed new password, then at step 1335, a full match is found and a matching report is generated, and the system 200 continues to perform step 1340. However, if the full hashed password of this account is different than the full hashed new password, then the system 200 directly performs step 1340 without performing the step 1335. At step 1340, the system 200 retrieves the hashed characters of the password of this account (referenced by PRO_Compare_N) from the PRO password storage database as shown in FIG. 12. The system 200 checks whether any hashed character combination of this account (referenced by PRO_Compare_N) is the same as the hashed character combination of the new proposed password (for use by the account referenced by PRO_Change). The character combination is defined in the corresponding matching policy. Multiple matching policies may be checked. At step 1345, if hashed character combination of this account is the same as the hashed character combination of the new password, then at step 1350, a partial match is found and a matching report is generated. If hashed character combination of this account is different than the hashed character combination of the new password, then the process returns to the step 1320 for the next account of this PRO_Compare_N, until all the accounts of this PRO_Compare_N are evaluated. Thus, at step 1355, the evaluation for all the accounts of this PRO_Compare_N ends, and the process returns to the step 1300 for the next PRO_Compare_N having a uniqueness requirement, until all the PROs having a uniqueness requirement are evaluated. Thus, at step 1360, the evaluation for all the PRO_Compare_Ns ends. In other embodiments, the steps 1340, 1345, and 1350 can be skipped if no partial match is defined in the matching policy (i.e., only the full match is defined in the matching policy). In another embodiment, the steps 1325, 1330, and 1335 can be skipped if no full match is defined in the matching policy (i.e., only the partial match is defined in the matching policy). Thus, in the example as shown in FIG. 13, the full match evaluation is optional.

Figure 14:
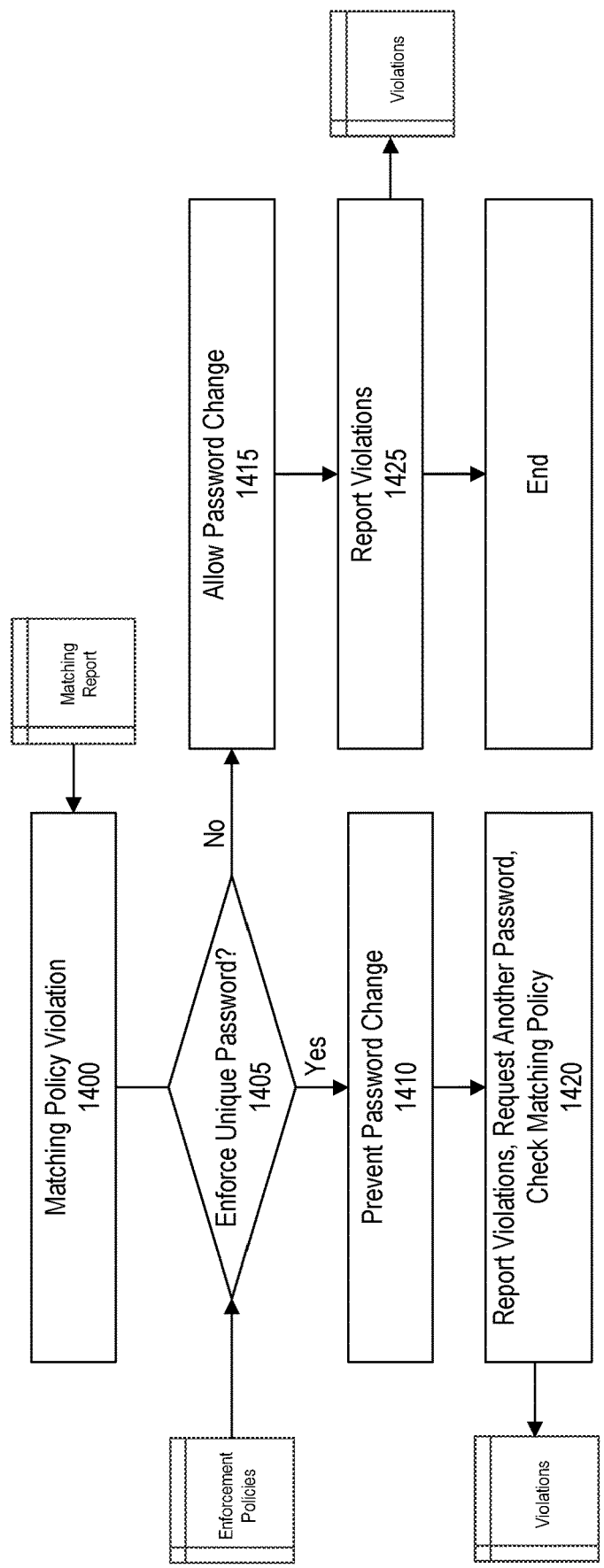
FIG. 14 is a flow diagram showing the process for evaluating the Enforcement Policy, according to embodiments provided herein.

FIG. 14 shows the process for evaluating the Enforcement Policy, according to embodiments provided herein. Once it is determined that a password match exists between two PROs, the Password Enforcement Policy determines the action that is taken. First, it is determined whether password uniqueness must be enforced. If not, the match violation is reported, and the password change is permitted to occur. If enforcement is required, the password change is prevented, the match violation is reported to the user who proposed the password, and the user is prompted to propose another new password, after which the matching policy is re-evaluated for the newly proposed password, as illustrated in FIG. 13. Reporting the violation may include creating a violation report, logging the violation in an audit log, an email notification, triggering an alert in a SIEM (Security information and event management), or taking any other action.

As shown in FIG. 14, at step 1400, the system 200 receives a matching policy violation, i.e., a matching report is generated in the process as illustrated in FIG. 13. At step 1405, the system checks whether the password uniqueness requirement is enforced according to the enforcement policies. If the password uniqueness requirement is not enforced, then at step 1415, the password change is allowed, and at step 1425, password uniqueness violation is reported. If the password uniqueness requirement is enforced, then at step 1410, the proposed password change is prevented, and at step 1420, password uniqueness violation is reported, and the system requests the user to propose another new password. Thus the system 200 performs the matching policy evaluation again for the newly proposed password as illustrated in FIG. 13, until a qualified password is proposed and allowed. In another embodiment, the system does not prompt the user to propose a new password, and cancels the password change process.

Figure 15:
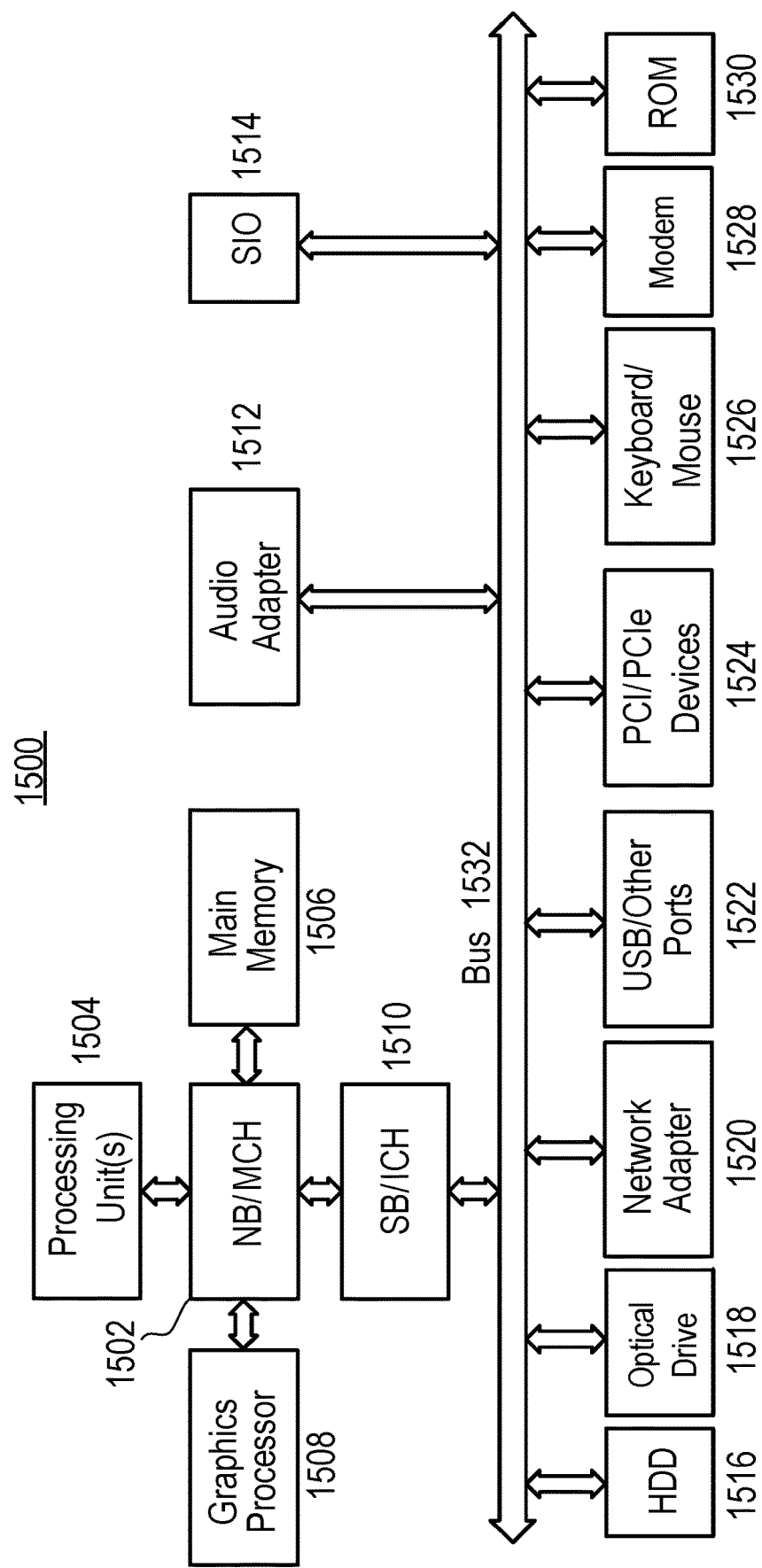
FIG. 15 is a block diagram of an example data processing system 1500 in which aspects of the illustrative embodiments are implemented.

FIG. 15 is a block diagram of an example data processing system 1500, such as the first computing device 220, or/and the second computing device 222 as shown in FIG. 2, in which aspects of the illustrative embodiments may be implemented. Data processing system 1500 is an example of a computer, such as a server or client, in which computer usable code or instructions implementing the process for illustrative embodiments of the present invention are located. In one embodiment, FIG. 15 may represent a server computing device.

In the depicted example, data processing system 1500 can employ a hub architecture including a north bridge and memory controller hub (NB/MCH) 1502 and south bridge and input/output (I/O) controller hub (SB/ICH) 1510. Processing unit 1504, main memory 1506, and graphics processor 1508 can be connected to the NB/MCH 1502. Graphics processor 1508 can be connected to the NB/MCH 1502 through, for example, an accelerated graphics port (AGP).

In the depicted example, a network adapter 1520 connects to the SB/ICH 1510. An audio adapter 1512, keyboard and mouse adapter 1526, modem 1528, read only memory (ROM) 1530, hard disk drive (HDD) 1516, optical drive (e.g., CD or DVD) 1518, universal serial bus (USB) ports and other communication ports 1522, and PCI/PCIe devices 1524 may connect to the SB/ICH 1510 through bus system 1532. PCI/PCIe devices 1524 may include Ethernet adapters, add-in cards, and PC cards for notebook computers. ROM 1530 may be, for example, a flash basic input/output system (BIOS). The HDD 1516 and optical drive 1518 can use an integrated drive electronics (IDE) or serial advanced technology attachment (SATA) interface. A super I/O (SIO) device 1514 can be connected to the SB/ICH 1510.

An operating system can run on processing unit 1504. The operating system can coordinate and provide control of various components within the data processing system 1500. As a client, the operating system can be a commercially available operating system. An object-oriented programming system, such as the Java™ programming system, may run in conjunction with the operating system and provide calls to the operating system from the object-oriented programs or applications executing on the data processing system 1500. The data processing system 1500 can be a symmetric multiprocessor (SMP) system that can include a plurality of processors in the processing unit 1504. Alternatively, a single processor system may be employed.

Instructions for the operating system, the object-oriented programming system, and applications or programs are located on storage devices, such as the HDD 1516, and are loaded into the main memory 1506 for execution by the processing unit 1504. The processes for embodiments described herein can be performed by the processing unit 1504 using computer usable program code, which can be located in a memory such as, for example, main memory 1506, ROM 1530, or in one or more peripheral devices.

A bus system 1532 can be comprised of one or more busses. The bus system 1532 can be implemented using any type of communication fabric or architecture that can provide for a transfer of data between different components or devices attached to the fabric or architecture. A communication unit such as the modem 1528 or the network adapter 1520 can include one or more devices that can be used to transmit and receive data.

Those of ordinary skill in the art will appreciate that the hardware depicted in FIG. 15 may vary depending on the implementation. Other internal hardware or peripheral devices, such as flash memory, equivalent non-volatile memory, or optical disk drives may be used in addition to or in place of the hardware depicted. Moreover, the data processing system 1500 can take the form of any of a number of different data processing systems, including but not limited to, client computing devices, server computing devices, tablet computers, laptop computers, telephone or other communication devices, personal digital assistants, and the like. Essentially, data processing system 1500 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112(f) unless the element is expressly recited using the phrase "means for."

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement the method of enforcing password uniqueness for different user accounts of a particular user, the method comprising:
receiving, by the processor, a first new password from a first user account of the particular user, wherein the first user account is associated with a first object referenced by a first Password Relationship Object (PRO);
evaluating, by the processor, a uniqueness policy to determine whether password uniqueness is required by one or more other PROs, wherein each object referenced by the one or more other PROs is associated with a different user account of the particular user;

determining that the password uniqueness is required by the one or more other PROs, responsive to said determination, evaluating, by the processor, a matching policy to determine whether the first new password matches any password of each different user account associated with one or more objects referenced by the one or more other PROs; and when the matching policy determines that there is a match, enforcing, by the processor, an enforcement policy, further comprising reporting a password uniqueness violation, wherein the password uniqueness violation includes the one or more other PROs on which the password uniqueness violation is found, a user account on which the password uniqueness violation is found, and a violated password uniqueness policy.

2. The method as recited in claim 1, further comprising:
when the matching policy determines that there is a match, the step of enforcing the enforcement policy further comprising:
blocking, by the processor, the first new password;
requesting, by the processor, a second new password from the particular user;
evaluating, by the processor, the matching policy to determine whether the second new password matches any password of each different user account associated with the one or more objects referenced by the one or more other PROs, wherein the step of blocking to the step of checking are repeated until an acceptable new password does not match any password of each different user account associated with the one or more objects referenced by the one or more other PROs; and
storing the acceptable new password for the first user account.

3. The method as recited in claim 1, wherein each PRO comprises a plurality of fields including a unique identifier, a relationship with one or more passwords, a type of referenced object, and a reference, wherein the reference includes at least one of an Internet Protocol (IP) address, a port, a protocol, a connection string, a query string, a reference string, a file, and a Uniform Resource Locator (URL).

4. The method as recited in claim 1, wherein a password of each different user account is stored in a password vault, and the password of each different user account is a hashed password, wherein each character of the password of each different user account is stored in the password vault, and each character of the password of each different user account is a hashed character.

5. The method as recited in claim 1, wherein the matching policy includes a partial match, wherein in the partial match, a predetermined number of characters of the first new password are the same as the predetermined number of characters of any password of each different user account associated with the one or more objects referenced by the one or more other PROs.

6. The method as recited in claim 1, wherein the first PRO includes a reference to the first object having a relationship with the first new password, wherein the first object is at least one of a local authentication repository, a centralized authentication repository, a user account, a group of user accounts, a file storing a list of passwords, a URL storing the list of passwords, and a database storing the list of passwords.

7. The method as recited in claim 6, wherein the centralized authentication repository is accessible via an authentication protocol including one of Lightweight Directory Access Protocol (LDAP), Remote Authentication Dial-In User Service (RADIUS), Terminal Access Controller Access Control System (TACACS+), Open Authorization (OAuth), and Security Assertion Markup Language (SAML).

8. A non-transitory computer readable storage medium embodying program instructions for enforcing password uniqueness for different user accounts of a particular user, the program instructions executable by a processor to cause the processor to:

receive a first new password from a first user account of the particular user, wherein the first user account is associated with a first object referenced by a first Password Relationship Object (PRO);

evaluate a uniqueness policy to determine whether password uniqueness is required by one or more other PROs, wherein each object referenced by the one or more other PROs has a different user account of the particular user;

determine that the password uniqueness is required by the one or more other PROs, responsive to said determination, evaluate a matching policy to determine whether the first new password matches any password of each different user account associated with one or more objects referenced by the one or more other PROs; and when the matching policy determines that there is a match, enforce an enforcement policy, further comprising reporting a password uniqueness violation, wherein the password uniqueness violation includes the one or more other PROs on which the password uniqueness violation is found, a user account on which the password uniqueness violation is found, and a violated password uniqueness policy.

9. The non-transitory computer readable storage medium as recited in claim 8, wherein the processor is further caused to:

when the matching policy determines that there is a match, the step of enforcing the enforcement policy further comprising:
block the first new password;
request a second new password from the particular user;
evaluate the matching policy to determine whether the second new password matches any password of each different user account associated with the one or more objects referenced by the one or more other PROs, wherein the step of blocking to the step of checking are repeated until an acceptable new password does not match any password of each different user account associated with the one or more objects referenced by the one or more other PROs; and
store the acceptable new password for the first user account.

10. The non-transitory computer readable storage medium as recited in claim 9, wherein the one or more other PROs are included in a Password Uniqueness Group (PUG).

11. The non-transitory computer readable storage medium as recited in claim 10, wherein a password of each different user account is stored in a password vault, wherein the password of each different user account is a hashed password using a secret salt.

12. The non-transitory computer readable storage medium as recited in claim 8, wherein the first user account has a different user name than the other user accounts of the particular user.

13. The non-transitory computer readable storage medium as recited in claim 8, wherein the first PRO includes a reference to the first object having a relationship with the first new password, wherein the first object is at least one of a local authentication repository, a centralized authentication repository, a user account, a group of user accounts, a file storing a list of passwords, a URL storing the list of passwords, and a database storing the list of passwords.

14. The non-transitory computer readable storage medium as recited in claim 13, wherein the centralized authentication repository is accessible via an authentication protocol including one of Lightweight Directory Access Protocol (LDAP), Remote Authentication Dial-In User Service (RADIUS), Terminal Access Controller Access Control System (TACACS+), Open Authorization (OAuth), and Security Assertion Markup Language (SAML).

15. A system for enforcing password uniqueness for different user accounts of a particular user, comprising:
a processor coupled with a memory, configured to:
receive a first new password from a first user account of the particular user, wherein the first user account is associated with a first object referenced by a first Password Relationship Object (PRO);
evaluate a uniqueness policy to determine whether password uniqueness is required by one or more other PROs, wherein each object referenced by the one or more other PROs has a different user account of the particular user;
determine that the password uniqueness is required by the one or more other PROs, responsive to said determination,
evaluate a matching policy to determine whether the first new password matches any password of each different user account associated with one or more objects referenced by the one or more other PROs; and
when the matching policy determines that there is a match,
enforce an enforcement policy, further comprising reporting a password uniqueness violation,
wherein the password uniqueness violation includes the one or more other PROs on which the password uniqueness violation is found, a user account on which the password uniqueness violation is found, and a violated password uniqueness policy.

16. The system as recited in claim 15, the processor is further configured to:
when the matching policy determines that there is a match, the step of enforcing the enforcement policy further comprising:
block the first new password;
request a second new password from the particular user;
evaluate the matching policy to determine whether the second new password matches any password of each different user account associated with the one or more objects referenced by the one or more other PROs, wherein the step of blocking to the step of checking are repeated until an acceptable new password does not match any password of each different user account associated with the one or more objects referenced by the one or more other PROs; and
store the acceptable new password for the first user account.

17. The system as recited in claim 15, wherein a password of each different user account is stored in a password vault, wherein the password of each different user account is a hashed password using a secret salt.

18. The system as recited in claim 17, wherein the first user account has a different user name than the other user accounts of the particular user.

19. The system as recited in claim 15, wherein the first PRO includes a reference to an object having a relationship with the first new password, wherein the object is at least one of a local authentication repository, a centralized authentication repository, a user account, a group of user accounts, a file storing a list of passwords, a URL storing the list of passwords, and a database storing the list of passwords.

* * * * *